COLOUR TELEVISION SIGNAL DEMODULATING CIRCUITS

Filed Jan. 20, 1964 3 Sheets-Sheet 1

INVENTOR.
MAURICE SAUVANET
By
agent

COLOUR TELEVISION SIGNAL DEMODULATING CIRCUITS

Filed Jan. 20, 1964 3 Sheets-Sheet 2

INVENTOR
MAURICE SAUVANET
By [illegible] Agent

INVENTOR.
MAURICE SAUVANET
BY [signature]

United States Patent Office 3,283,066

Patented Nov. 1, 1966

3,283,066

COLOUR TELEVISION SIGNAL DEMODULATING CIRCUITS

Maurice Sauvanet, Levallois, France, assignor to Compagnie Francaise de Television, a corporation of France Filed Jan. 20, 1964, Ser. No. 338,689
Claims priority, application France, Jan. 21, 1963, 922,046, Patent 1,354,180; Aug. 6, 1963, 943,875
15 Claims. (Cl. 178—5.4)

The present invention relates to demodulating circuits for colour television. More particularly, it is an object of the invention to provide an improvement in the demodulating circuits used in colour television systems wherein the complex video signal comprises a first picture signal and at least one subcarrier which is frequency modulated by a second picture signal.

In such systems, the problem arises of maintaining or restoring, before the final utilization of the demodulated signals, the correct relative level of the second signal with respect to the first one, inasmuch as the two signals are used for trichrome picture reproduction, and that any error in the relative levels of the components of the signals applied to the image reproducing device alters the chromaticity of the reproduced colours.

The invention will be more particularly set forth within the framework of the sequential-simultaneous colour television system with memory, which, in its preferred embodiment, uses an amplitude modulated carrier wave and a frequency-modulated subcarrier wave.

It is known that in this system, the first picture signal is a wide band luminance signal, whereas the signal modulating the subcarrier is alternately built up by one of two narrow band colour signals, alternating at the line frequency and which will be referred to as auxiliary signals A1 and A2.

In order to distinguish the wide band luminance signal from the narrow band luminance signal which is a component of the two auxiliary signals, the wide band luminance signal will be designated, not by Y as is often the case, but by $Yw$.

For the reproduction of the image each of the two sequentially transmitted signals is repeated in the receivers, for example by means of a delay device, during the line periods during which it is not transmitted. This repetition may occur after demodulation of the subcarrier, in which case a single frequency demodulator is used, or before demodulation of the subcarrier, in which case two frequency demodulators, one of which is for example associated with signals A1, both direct and delayed, and the other with signals A2, direct and delayed, are then necessary.

Through this repetition of the auxiliary signals, the three signals $Yw$, A1 and A2 are made simultaneously available, and through suitable combinations thereof, the three colour signals applied to the image reproducing device are derived.

At any point of a circuit where it is available signal $Yw$ may be written as $k'Ywo$, where $Ywo$ depends upon the coloured content of that point of the televised scene which is being scanned at the transmitter, and where $k'$ is a coefficient resulting from the various amplifications and attenuations which have been deliberately imparted to this signal, and/or from fortuitous causes. This coefficient $k'$ will be said to be the "transmission coefficient" of the luminance signal at the considered point of the circuit.

In the same way, each of the two signals $Ai$ ($i$=1 or 2) may be written, at any point of a circuit where it appears, as $k''Aio$, where $Aio$ depends upon the coloured content of the image point being televised, and where $k''i$ is the transmission coefficient for $Ai$ at the considered point of the circuit.

The relative level of signal $Ai$ with respect to signal $Yw$ for the two considered circuit points, is $Ni=k''i/k'i$.

In a general manner, the two signals A1 and A2 considered in this respect in a demodulating circuit will appear either in two different channels, or, sequentially, in the same channel, according to whether they have been switched to two different channels in accordance with their nature. (i.e according to whether they are A1 or A2 signals) or not. In the first case, each train of signals $Ai$ relative to a picture line in more generally followed by the corresponding repeated train which is also referred to as a signal $Ai$. Moreover, the signals A1 and A2 considered from the point of view of their relative levels will be two signals appearing in corresponding points of their respective channels. The circuits are so adjusted in each of the two channels that they act in the same manner on both signals as concerns their levels. It may also be admitted, for all practical purposes, that the other factors act in the same manner upon the levels of both signals $Ai$, and finally considered that:

$$k''1=k''2=k''$$

$$N1=N2=N$$

which will be admitted henceforth.

Where a radio frequency transmission is concerned, one cause of the variation of N is the fact that the carrier is amplitude-modulated and the subcarrier frequency-modulated. As a consequence, any variation of the amplitude of the carrier wave as detected modifies the level of the detected signal, whereas, as long as the limiter preceding the frequency discriminator (or each of the two frequency discriminators) is saturated by the amplitude of the subcarrier, this amplitude variation of the detected carrier will not affect $k''$.

In a similar manner, and this now applies whether the complex video signal is transmitted at video frequency or by means of a carrier wave, any amplification or attenuation of the complex video signal modifies coefficient $k'$, whereas, under the same conditions as previously (i.e. with the limiters saturated) it does not modify $k''$.

If the demodulating circuit is included in a receiver for final use, that is an apparatus comprising an image reproducing device, it is desirable that the viewer may vary the contrast without altering the chromaticity, in other words cause $k'$ and $k''$ to vary without modifying the value of $k''k'$. The use to this end of two entirely independent manual controls is not satisfactory: on the one hand, the viewer finds it a nuisance, on the other hand, he does not have at his disposal any precise criterion for correctly effecting this double adjustment.

According to the invention, a colour television signal demodulating circuit for use in a system wherein the complex video signal comprises a first picture signal and a subcarrier which is frequency modulated by a second picture signal, said circuit comprising a first signal-translating network delivering said first picture signal and a second signal-translating network delivering said second picture signal, said second signal-translating network comprising at least one frequency demodulator of the type including an input limiter, also comprises means for causing the limitation threshold of said limiter to vary automatically as a function of a reference signal included in said video complex signal.

The invention will be best understood, and other characteristics will appear, with the help of the following description and appended drawings, wherein.

For describing the invention, such as applied to the sequential-simultaneous colour television system with memory, the following will be moreover assumed:

Gw, Rw and Bw being the gamma connected primary colour signals with a bandwidth $w$, and G, R and B the same signals, but reduced by filtering to bandwidth $n$, the luminance signal $$Yw = aGw + bRw + cBw$$

where $a$, $b$ and $c$ are three constant coefficients whose sum is equal to 1.

For three conventional precise primary colours, these coefficients are equal to 0.59, 0.30, and 0.11.

Signal Y is equal to $$Y = aG + bR + cB$$

that is to say, it consists of the components of the band $n$ of signal Yw.

The signals transmitted by modulation of the subcarrier are $$A1 = (R-Y)/K1$$

$$A2 = (B-Y)/K2$$

where K1 and K2 are two constants.

Figure 1:
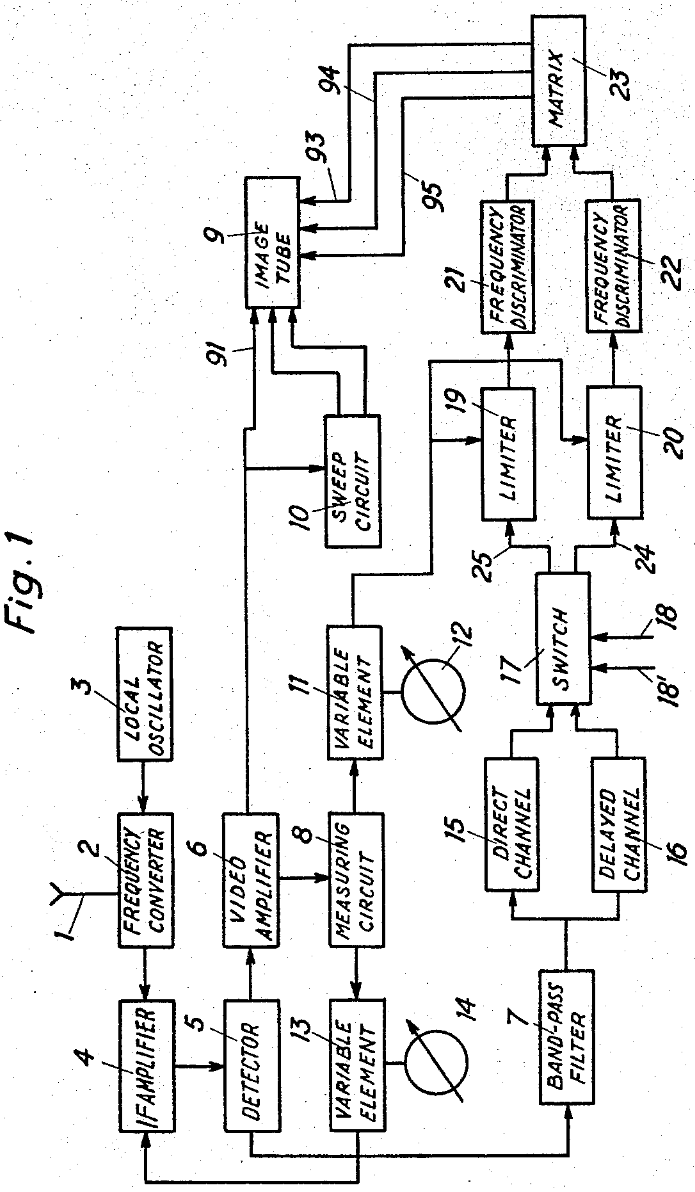
FIG. 1 is a block diagram of a preferred embodiment of the invention.

FIG. 1 shows the receiver circuit diagram reduced to the elements necessary for a proper understanding of the invention. In this figure an antenna 1 feeds a frequency changer stage 2, which is also fed from a local oscillator 3. The output of stage 2 feeds an intermediate frequency amplifier 4 provided with automatic gain control. Amplifier 4 thus supplies the modulated carrier reduced to the intermediate frequency. It feeds a detector 5.

Detector 5 feeds first a wide-band video amplifier 6, which supplies or restores the D.C. component. The output of amplifier 6 feeds the whole of the signal which modulates the carrier to a conventional circuit 10 which separates the synchronizing signals and generates the horizontal and vertical scanning signals applied to the picture reproduction device 9, which, in this example, is a three-gun tricolour tube.

Amplifier 6 also supplies device 9 with the luminance signal with a negative coefficient $-k'$ whose absolute value $k'$ depends on the carrier level at the output of amplifier 4, on the characteristics of detector 5 and on the gain of amplifier 6.

Lastly, amplifier 6 feeds a measuring circuit 8 which delivers a voltage Uy, which is substantially proportional to $k'$.

The output of circuit 8 is connected to the input of a variable gain device 13, whose gain G can be controlled manually by means of a button 14.

The output voltage $Ug = GUy$ of device 13 is used to control the gain of amplifier 4 so as to stablize the coefficient $k'$ defined above as much as possible, by altering the gain of amplifier 4, the stabilized value of $k'$ depending on the adjustment of gain G effected by means of the manual control 14.

Detector 5 also feeds a band pass amplifier 7 which isolates the subcarrier and its modulation spectrum.

Amplifier 7, which constitutes the input of the receiver colour channels, feeds in parallel a direct channel 15, and a delayed channel 16, the latter imposing on its input signals a delay equal to the total duration, i.e. the reciprocal of the line scan frequency, of one picture line.

In this way, when channel 15 supplies the subcarrier modulated by signal A1 (or A2) corresponding to the line being scanned at the transmitter, channel 16 supplies the subcarrier modulated by signal A2 (or A1) corresponding to the previously scanned line. These signals obtained by repetition are assimilated to the signals corresponding to the picture line being scanned.

The outputs of channels 15 and 16 feed two inputs of a double switch 17 provided with two outputs 25 and 24.

Switch 17 is actuated during the horizontal blanking intervals so as to connect alternately its output 25 to the direct channel and its output 24 to the delayed channel, and conversely.

The changes of state of switch 17 are operated by signals applied to its control inputs 18 18', these signals being such that during the active portions of field periods, i.e. the time intervals between two vertical blanking intervals, the subcarrier is directed to output 25 if it is modulated by signal A1 (direct or delayed) and to output 24 if modulated by signal A2 (direct or delayed).

The switch control signals are generated in known circuits (not shown) using so-called identification signals, which are transmitted by the transmitter either during at least certain horizontal blanking intervals, or during vertical blanking intervals.

Output 25 feeds a frequency demodulator consisting of a limiter 19 and a frequency discriminator 21; output 24 similarly feeds a frequency demodulator consisting of a limiter 20 and a frequency discriminator 22.

At the respective outputs of discriminators 21 and 22 are respectively collected the demodulated signals A1 and A2, or more accurately, signals $k''$A1 and $k''$A2, where $k''$ is a constant whose magnitude is dependent, for given discriminators, only on the limiting threshold of limiters 19 and 20 since the operation concerned is a frequency demodulation.

Signals $k''$A1 and $k''$A2 are applied to a matrix 23, designated to supply the signals $$R-Y, B-Y, \text{ and } G-Y$$

when it is supplied with signals $A1 = (R-Y)/K1$ and $A2 = (B-Y)/K2$.

As a matter of fact, from the expression for Y given above there results that the three "difference signals" R–Y, B–Y, and G–Y are related by the relation:

$$a(G-Y) + b(R-Y) + c(B-Y) = 0$$

and that these three signals can be derived, by linear operations, from signals A1 and A2.

Since these operations are linear, the signals collected at outputs 93, 94 and 95 of matrix 23 have the same coefficients $k''$ as signals A1 and A2, and are thus respectively:

$$k''(G-Y),\ k''(R-Y),\ k''(B-Y)$$

These signals are respectively applied to the control electrodes of the so-called "green," "blue" and "red" guns, which are respectively used for the reproduction of the green, blue and red picture components, while voltage $-k'Yw$ is applied to the cathodes of all the three guns.

Th difference of potential between the control electrode and the cathode, which is applied to the green gun is then:

$$G' = k''(G-Y) + k'Yw$$

$$G' = k''G + (k'-k'')Y + k'Yh$$

where Y$h$ is the level of the signal made up of the components of the signal Yw in band $h$, that is to say band $w$ less band $n$.

Similary, the differences of potentials between the control electrode and the cathode which are applied to the "red" and "blue" guns are respectively:

$$R' = k''R + (k'-k'')Y + k'Yh$$

$$B' = k''B + (k'-k'')Y + Yh$$

It is to be noted that the delayed signals are assimilated to the correct signals (relative to the line being scanned at the transmitter).

The non-linearity of the opticoelectric translation devices at the transmitter and of the electrooptical translation devices at the receiver, is essentially corrected at the transmitter by the gamma correction applied to signals R*w*, G*w*, B*w*. In actual fact this correction is not perfect since the signals applied to the guns are not the R*w*, G*w* and B*w* signals. Here again experience has shown that the pre-correction applied to signals R*w*, B*w*, G*w* is adequate.

For purposes of simplification these causes of inaccuracy will be disregarded in the present description. The conclusions reached with this simplification are sufficiently close to actual fact for their adoption in practice.

Further, the picture reproduction system is designed to give a picture in accordance with the original for a specific value $k_0$ common to $k'$ and $k''$.

Under these conditions and with the abovementioned approximation the transmitted signals are adapted to the three-colour tube so that:

(a) The application to the green, red and blue guns of voltages $k_0$G, $k_0$R, $k_0$B shall produce at each point a colour whose shade (e.g. yellow), saturation (e.g. distinguishing between a pure yellow and the same yellow more or less mixed with white) and luminance (brightness) shall be in accordance with those of the point which gave rise at the transmitter to signals R,B,G.

The luminance can then be expressed by $k_0Y$ (where $Y=aG+bR+cB$).

The application of three signals $k''R$, $k''B$, $k''G$, with $k''$ different from $k_0$, does not modify the colour obtained as regards shade or saturation, but modifies the brightness in the ratio $k''/k_0$ by expansion or compression of the luminance scale (contrast).

(b) The application to the three guns of equal voltages E substantially produces a white light, whose luminance can be expressed by E.

Under these conditions, and still with the approximation indicated, if $k'-k''=k_0$, the picture obtained is the superposition of a colour picture, whose definition is limited by the frequency band *n*, and whose shade, saturation and brightness are in accordance with the original, as considered with the same definition, and of a black and white or achrome coloured picture providing the finer details of the picture being televized by merely varying the luminance, the total luminance of the complex picture corresponding to that of the original, it being possible to express it by $k_0$Y*w*.

If $k'=k''=k\neq k_0$, the brightness of the different points of the picture is modified in the ratio $k/k_0$ by expansion or compression in the ratio of the luminance scale, but shade and saturation of the complex picture are unaffected.

If now $k''$ differs from $k'$, the overall brightness of the complex picture is expressed by $k'$Y*w*; the shade of the picture with reduced definition remains correct, but not the saturation, the colours being more or less saturated than those of the televized object depending upon whether $k'-k''$ is negative or positive.

Independently of the value of $k''$, a correct absolute luminance of the various picture points corresponds to a given value $k_0$ of $k'$, for Example 1. But experience has shown that in the same manner as in black-and-white television, the observer, for reasons of the general illumination, for example, or simply as a matter of taste, may prefer a more expanded or more compressed luminance scale than that which corresponds to the original luminance, in other words that he wishes to be able to vary the contrast.

In accordance with the above explanations, this is easily obtained by varying the coefficient $k'$ by means of control button 14. Such a control is in any case necessary, quite apart from the observer's personal taste, for it is important ta be able to vary the automatic gain control button 14. Such a control is in any case neces- it is important to be able to vary the automatic gain control voltage (by varying coefficient G) to take into account the slow variations of the prevailing average propagation conditions. But varying $k'$ alone involves a serious drawback:

$k''$ is no longer equal to $k'$, and hence a modification of contrast falsifies colours as regards their saturation, a value of $k'$ higher than $k''$ making them insufficiently saturated and a value of $k'$ less than $k''$ too saturated.

The whole of the part of the receiver so far described is known.

In known receivers there has been inserted, in order to overcome the drawback mentioned above, a manual control varying, for example, the threshold of limiters 19 and 20 with a view to correcting $k''$ after a correction has been made to $k'$.

It is clear that such an arrangement is not entirely satisfactory.

According to a preferred embodiment of the invention, $k''$ is made to follow the variations of $k'$ by the use of limiters whose limiting threshold can be linearly controlled by a D.C. voltage, and by applying to the control input of these limiters a D.C. control voltage $Uc=AUx$, where U*x* is a voltage proportional to $k'$ and A a variable factor, whose value can be adjusted.

According to a further refinement, shown in FIG. 1, voltage U*x* is derived in the same measuring circuit 8 as voltage U*y*.

This voltage is made available at the second input of circuit 8, which is connected to the variable gain element 11, for example a potentiometer, whose output is connected to the threshold control inputs of limiters 19 and 20. Element 11 comprises a control knob 12 for varying the value of A.

In this manner, factor A, which, for a given value makes $k''$ equal to $k'$, can still be set to a different value for an observer who happens to prefer colours with more or less saturated than in the original. Thus, for a value of $k''$ different from $k'$, and with the same approximation as above, picture contrast is always determined by $k'$, whereas saturation varies substantially in the same direction as the expression $s=1-(k'-k''/k'')$, the value 1 corresponding to correct saturation.

Thus, the saturation, whether correct or not, will remain constant if the limiter voltages automatic control keeps $k'/k''$ constant, once this ratio has been manually set to value 1 corresponding to the correct saturation or to a value different from 1.

Figure 2:
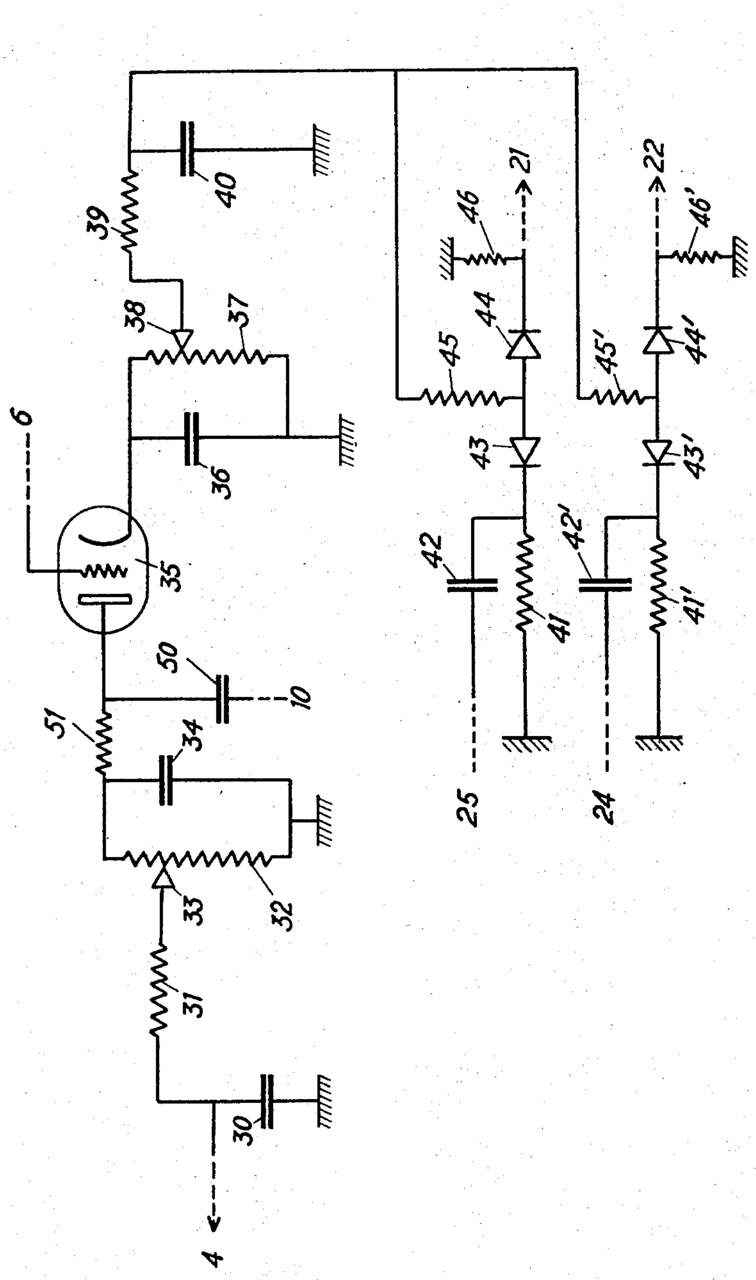
FIG. 2 is a more detailed diagram of part of the circuit of FIG. 1.

FIG. 2 shows an example of a detailed embodiment of circuits 8, 13, 14, 11, 12, 19 and 20 of FIG. 1.

Arrangements 8, 11, 12, 13 and 14 correspond to the upper part of the figure. It includes a triode 35, whose grid is connected to the output of video amplifier 6, and whose anode is grounded through an integrator circuit consisting of a resistance 51 and a capacitor 34 in series. A potential divider resistance 32, provided with a slider 33, is connected between the terminals of capacitor 34. Slider 33 is grounded through a resistance 31 in series with a capacitor 30. The anode is connected to one terminal of a capacitor 50 whose other terminal receives positive pulses, whose duration corresponds to the duration of the horizontal fly-back intervals, these pulses being obtained as known in the art in the scanning circuits 10, shown in FIG. 1.

The grid of triode 35 is connected to the output of video amplifier 6. Assuming the cathode is grounded, the arrangement as just described, constitutes a known circuit for the generation of the gain control voltage of amplifier 4.

The triode is unblocked only when the positive pulses, mentioned above, are applied. During each horizontal fly-back interval the voltage at the terminals of capacitor 34 takes up a value corresponding to $q1u$, where $u$ is the positive peak value of the signal applied to the grid during this time interval, and $q1$ is a negative amplification factor determined by constants of the triode and the associated circuit.

But, as is well known, the output signal $Sv$ from amplifier 6 which, during the active portions of each line interval, consists of the luminance signal $Yw$, comprises, during each line blanking interval, a line synchronizing pulse bracketed by two pedestals, these latter signals being transmitted, as is signal $Yw$, by direct modulation of the carrier.

If the carrier is modulated with negative modulation, signal $Sv$ is applied to the grid of triode 35 in such a manner that $Yw$ has a negative polarity; the peak value $u$ of signal $Sv$ during each line blanking interval corresponds to the peak of the positive synchronizing pulses; but $u=k'U$, where U is the corresponding peak value at the transmitter, the latter corresponding to about 1.25 times the maximum black-to-white range at the transmitter.

If the carrier is modulated with positive modulation, the signal $Sv$ is so applied that the signal $Yw$ shall be of positive polarity; the peak value $u=k'U$ then corresponds to the blanking pedestals, U corresponding to a transmission at about ⅓ of the maximum black-to-white range.

In either case, $u=k'U$ and the voltage $Uy=q1k'U$ at the terminals of capacitor 34 reproduces it with the negative amplification factor $q1$.

A fraction, determined by the position af slider 33, of the voltage $Uy$ is collected and passed through a low-pass filter circuit 31–30, the negative voltage $Ug$ collected at the terminals of capacitor 30 being finally applied to amplifier 4 so that the absolute value of its gain shall vary in the direction opposite to that of the absolute value of the control voltage applied to it.

The gain control voltage, and hence the contrast can also be adjusted by manually adjusting the position of slider 33, which position determines the factor G mentioned above.

The arrangement described so far thus correspond to elements 8, 13 and 14 of FIG. 1.

The use of such an arrangement for automatic gain control and contrast adjustment makes it possible to obtain the limiter control voltage by means of a few additional elements.

According to a preferred embodiment of the invention, an integration capacitor 36 is inserted between the cathode of triode 35 and ground. A potential divider resistance 37 is connected between the terminals of this capacitor. This resistance is provided with a slider 38 grounded through a resistance 39 and a capacitor 40 in series.

This arrangement operates as the corresponding anode circuit, except that the voltage at the terminals of the integrator circuit is no longer $q1u$ but substantially equal to $u=k'U$.

(It is of course understood that henceforth factor q1 is to be taken as that of the triode with the additional elements.)

An adjustable fraction of this voltage is collected by means of slider 38, and passed through the low-pass filter 39–40, the positive voltage at the terminals of capacitor 40 being that used for controlling the limiters.

Limiter 19, which is of a known type, includes two diodes 43 and 44, whose anodes are connected to one terminal of a resistance 45, whose second terminal is connected to the common point of resistance 39 and condenser 40; the cathodes of the two diodes 43 and 44 are connected to ground by two resistances 41 and 46; the terminal common to diode 43 and resistance 41, constituting the limiter input, is connected, through a coupling condenser 42, to output 25 of the double switch 17 of FIG. 1; the terminal common to diode 44 and resistance 46, constituting the limiter output, is coupled to the frequency discriminator 21 of FIG. 1.

Limiter 20 is identical to elements 41' to 46' respectively corresponding to elements 41 to 46, and connected, in a similar way, to output 24 of switch 17, to the frequency discriminator 22, and to the point common to resistance 39 and capacitor 40.

The voltage $Au=Ak'U$ thus adjusts the threshold value U of the limiters to a value substantially proportional to A$u$.

Any specific value of A makes $k''/k'$ constant. A particular value of A makes $k''/k'=1$ (correct saturation). But, as already mentioned, the viewer may prefer to make $k''/k'$ greater or less than 1, in order to modify the saturation of the reproduced colours, as compared to that of the colours of the televized object.

Lastly, the value of $A=0$ (slider 38 grounded) gives $k''=0$ and enables the viewer to suppress colours completely, should he so desire.

It is to be understood that the invention is not limited to the embodiment described and illustrated.

In particular, triode 35 in the circuit of FIG. 2 may be replaced by a transistor, the necessary adaptations being within the skill of those skilled in the art.

And it should be noted that the linking of the limiter threshold to the relative level of the signal transmitted by direct modulation of the carrier is useful, even if the signal transmitted by direct modulation of the carrier is not the luminance signal. For example, if the signal modulated on the carrier were the signal $G+Hh$, and the signals transmitted by frequency modulation signals B and R, with application on the guns of the picture reproduction tube of voltages:

$$k'(G+Yh),$$
$$k''B+k'Yh,$$
$$k''R+k'Yh,$$

$k'Yh$ being derived by filtering the signal $k'(G+Yh)$, with the system arranged for $k'=k''=k$, the device according to the invention would still be useful, the picture brightness varying with $k$.

The peak level of the signal transmitted during the horizontal fly back intervals, which provides a satisfactory measure of $k'$, has been used here as a reference. Of course this is by no means limitative.

Any suitable reference signal, existing in the transmitted complex video signal, may be used, and in particular the test lines which are generally transmitted during the vertical blacking intervals for the adjustment of the receivers by constructors or repairers.

Also a special reference signal could be transmitted specially for the purpose considered here.

There is one particular reference signal, the use of which allows a simplification of the demodulating circuits; this signal is the amplitude of the subcarrier itself. In this case, the means for detecting the reference signal, the limiters, and the means for controlling the limiter thresholds may be combined by using self-biased limiters, i.e. limiters whose output level, although not responsive to rapid variations of the amplitude if its input signal is nevertheless proportional to the average of this amplitude over the duration of a few frame periods.

Figure 3:
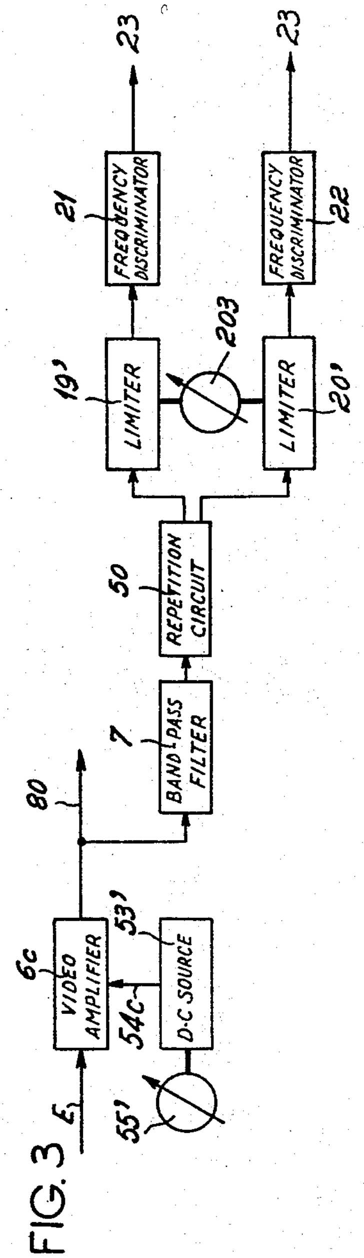
FIG. 3 is the block diagram of another embodiment of the invention.

FIG. 3 is the block diagram of a receiver circuit embodying such an arrangement.

In this figure, the signal obtained through detecting the carrier wave is applied to a terminal E, the transmission coefficient of this detected signal being preferably stabilized by means of an automatic gain control device of any known type, not shown in the figure.

Input E feeds a variable gain video frequency amplifier 6c, whose gain is controlled by means of a D.-C. voltage applied to its gain control input 54c. The latter is supplied by element 53' and adjusted by means of knob 55'.

Amplifier 6c feeds output 80, supplying the luminance signal, possibly through a second video frequency amplifier. It also feeds filter 7, followed by circuit 50, whose two outputs are coupled to the inputs of two self-biased limiters 19' and 20', the latter being respectively followed by frequency discriminators 21 and 22. The remainder of the circuit is the same as in the diagram of FIG. 1.

Circuit 50 corresponds to elements 15, 16 and 17 of FIG. 1.

If the receiver comprises a trap, i.e. a selective circuit attenuating the luminance signal in the frequency band corresponding to the center portion of the spectrum of the modulated subcarrier, this trap should preferably be included as an element acting on the video complex signal after the subcarrier has been extracted therefrom by means of filter 7, for example in the second video frequency amplifier, mentioned above.

The constants of the self-biased limiters 19' and 20' are such that those limiters deliver output signals whose amplitude is, as has already been pointed out, proportional to the average, over a few frame periods, of the amplitude of their input signal.

In this way, $k''$ varies in proportion to the amplitude of the subcarrier and the arrangement is satisfactory in so far as this amplitude is a good measure of $k'$.

In fact, while providing an appreciable result, this circuit will generally not be so satisfactory as that of FIG. 1, for the following reasons: the propagation conditions often bring about an attenuation which varies in accordance with the frequency (wherefrom results that the amplitude of the subcarrier, which lies in the upper portion of the spectrum of the luminance signal, does not vary any longer in proportion to the transmission coefficient of the latter); also the amplitude-frequency characteristic of the transmitter, or, more frequently, that of the receiver, may vary; or again, in the sequential-simultaneous system with memory, an auxiliary amplitude modulation may be imparted, for various purposes, to the subcarrier, and, for certain types of modulation, this modulation would not be sufficiently "spread out" through the effect of the time constant of the limiter.

Preferably, a supplementary manual control is then provided, which makes it possible to cause $k'$ alone, or $k''$ alone, to vary, in order to minimize the deficiencies of the arrangement based on the use of self-biased limiters or similar devices. A separate control of $k'$ may be, for example, obtained by means of an attenuator or of a further variable gain amplifier, inserted in the output channel of amplifier 6c, at a point lower than the feeding point of filter 7, but an individual control for $k''$ is to be much preferred. This second solution is illustrated in FIG. 3, where a device allowing a manual control of the limitation threshold, for a given amplitude of the input signal of the limiters 19' and 20', is shown. This device illustrated by means of the manual control knob 203 and its connections to limiters 19' and 20'.

Figure 4:
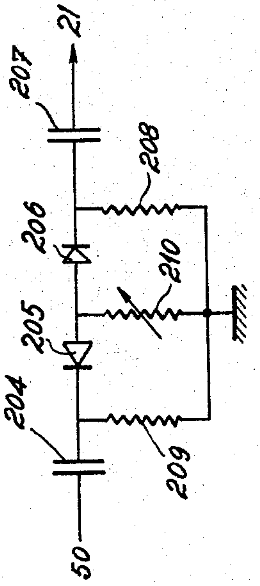
FIG. 4 is a detailed diagram of an element of the circuit of FIG. 3.

FIG. 4 gives an example of an embodiment of any one of the self-biased limiters 19' and 20', provided with an auxiliary manual thresholds control.

This limiter comprises two diodes 205 and 206 connected to each other by their anodes, their common terminal being connected to ground through a variable resistor 210, and their respective cathodes, being connected to ground respectively through resistors 209 and 208.

A capacitor 204 has its second terminal connected to the terminal common to diode 205 and to resistor 209, and a capacitor 207 has its first terminal connected to the terminal common to diode 206 and to resistor 208. The first terminal of capacitor 204, connected to one output of circuit 50, as shown in FIG. 3, is the signal input of the limiter, and the second terminal of capacitor 207 is the output thereof, and is coupled to discriminator 21, assuming the limiter to be limiter 19'.

The two capacitors 204 and 207 have the same capacity C. The two resistances 208 and 209 have the same value R'; the variable value of resistor 210 is R''.

The time constant of the limiter is thus $C(R'+R'')$. The value of C should be taken such that this time constant should be high compared to the duration of one frame period, for the variation interval practically used for R''.

For a given value of R'', the limitation threshold then follows the amplitude variations of the input subcarrier with a suitable time constant.

If R'' is varied in each of the two limitors 19' and 20' by means of the manual control 203 of FIG. 4, the threshold value is varied for a given amplitude of the subcarrier.

Of course, the invention is not limited to the embodiments described and shown.

It should be in particular noted that the invention may be applied to receivers which do not include any automatic gain control for the complex video signal.

This is in particular the case where a transmission at video frequency of the video complex signal, by means of a cable is concerned. In that case, the attenuation imparted to the video complex signal during the transmission is either negligible, or known beforehand with enough precision to make it possible to take it into account in the adjustment of an element of the circuit.

It is naturally possible, in particular when the complex video signal is transmitted by means of a cable, to use the arrangement of FIG. 1 for controlling the limitation threshold of limiters 19 and 20 with an input circuit (input E, variable gain amplifier 6c feeding filter 7) of the type of that shown in FIG. 3. Amplifier 6c of FIG. 3 then feeds, besides output 80, the measuring circuit 8 whose output signal is used for controlling the limiters. In that case, the measuring circuit is only used to that end.

The demodulating circuit according to the invention may be used in receiving circuits other than an image reproducing receiver.

It may, in particular, be used in a special effect device requiring the demodulation of the complex video signals delivered by two sources of image signals for deriving the complex video signal adapted for the special effect considered.

If, for example, it is desired to transmit a complex video signal for a "fading over," $k''$ and $k'$ must be caused to vary in the same proportion for the two signals derived from each video complex signal. The invention may be used to that end.

It should be noted that the demodulating circuits of special effect devices for the sequential-simultaneous systen with memory do not normally comprise means for repeating the sequentially transmitted signals, and, consequently, each demodulating circuit comprises but one frequency demodulator. This also applies to those image-reproducing receivers where the repetition is effected after demodulation. In that case of course there is but one limiter to be controlled.

In a general manner, the demodulating circuit according to the invention may be used, whenever the first and second picture signals are derived by means of a first and a second signal translating network, from the colour television signal received, whether the signal received is the video complex signal or a carrier wave modulated by the video complex signal. As shown in FIG. 1 the first and second signal translating network may have in common a plurality of input elements.

What is claimed is:

1. A colour television signal demodulating circuit for use in a colour television system wherein the complex video signal comprises a first picture signal and a subcarrier which is frequency-modulated by a second picture signal, said demodulating circuit comprising: a general input of applying thereto said colour television signal; a first signal-translating network, coupled to said general input, for delivering said first picture signal; a second signal-translating network, coupled to said general input, for delivering said second picture signal; said second signal-translating network comprising at least one frequency demodulator including a limiter and frequency discriminating means mounted in series; and means for causing the limitation threshold of said limiter to vary automatically as a function of a reference signal included in said video complex signal.

2. A colour television signal demodulating circuit for use in a colour television system wherein the complex video signal comprises a first picture signal and a subcarrier which is frequency-modulated by a second picture signal, said demodulating circuit comprising: a general input for applying thereto said colour television signal; a first signal-translating network, coupled to said general input, for delivering said first picture signal; a second signal-translating network, coupled to said general input, for delivering said second picture signal; said second signal-translating network comprising at least one frequency demodulator including a limiter and frequency discriminating means mounted in series, said limiter comprising a limitation threshold control input; and means for applying to said control input a control signal derived from said video complex signal.

3. A colour television demodulating circuit as claimed in claim 2, wherein said limiter is a limiter comprising two diodes having a common terminal, said limitation threshold control input being coupled to said common terminal.

4. A colour television signal demodulating circuit for use in a colour television system wherein the complex video signal comprises a first picture signal and a subcarrier which is frequency-modulated by a second picture signal, said demodulating circuit comprising a general input for applying thereto said colour television signal; a first signal-translating network, coupled to said general input, for delivering said first picture signal; a second signal-translating network, coupled to said general input, for delivering said second picture signal; said second signal-translating network comprising at least one frequency demodulator including a limiter and frequency discriminating means mounted in series, said limiter comprising a limitation threshold control input; and a measuring circuit, having an input coupled to said first signal-translating network, for measuring the peak-level of said complex video signal during the horizontal flyback intervals, and an output coupled to said control input of said limiter.

5. A colour television signal demodulating circuit as claimed in claim 4, wherein a manually adjustable variable gain element is inserted between said output of said measuring circuit and said control input of said limiter.

6. A colour television receiver for receiving a carrier wave which is amplitude-modulated by a complex video signal comprising: a first picture signal and a subcarrier which is frequency-modulated by a second picture signal, said receiver comprising: frequency changing means, an intermediate frequency amplifier having a gain control input and a detector mounted in series; a measuring circuit for measuring the peak level of said video complex signal during the horizontal flyback intervals, said measuring circuit having a first input coupled to said detector, a second input, a first output coupled to said gain control input and a second output; means for applying unblocking pulses to said second input of said measuring circuit; a filter having an input coupled to said detector and an output, said filter passing said modulated subcarrier; and a frequency demodulator comprising in series a limiter and frequency discriminating means, said limiter having a signal input, coupled to said filter output, and a limitation threshold control input, coupled to said second output of said measuring circuit.

7. A colour television receiver for receiving a carrier wave which is amplitude-modulated by a complex video signal comprising a first picture signal and a subcarrier which is alternately frequency-modulated by a first and a second colour signal, said receiver comprising: frequency changing means, an intermediate frequency amplifier having a gain control input, and a detector mounted in series; a measuring circuit for measuring the peak level of said video complex signal during the horizontal flyback intervals, said measuring circuit having a first input coupled to said detector, a second input, a first output coupled to said gain control input, and a second output; means for applying unblocking pulses to said second input of said measuring circuit; a filter having an input coupled to said detector and an output, said filter passing said modulated subcarrier; a direct and a delayed channel having respective inputs, coupled to said filter output, and respective outputs; a switch having a first and a second input, respectively coupled to said direct and delayed channel outputs, and two outputs, said switch having a first state in which it connects its first and second outputs respectively to its first and second outputs and a second state in which it connects its first and second outputs respectively to its second and first inputs; and two frequency demodulators, each comprising a limiter having a signal input and a limitation control input, and frequency discriminating means mounted in series; said signal inputs of said limiters being respectively coupled to said first and second outputs of said switch and said control inputs of said limiters being coupled to said second output of said measuring circuit.

8. A colour television receiver for receiving a carrier wave which is amplitude-modulated by a complex video signal comprising a first picture signal and a subcarrier which is frequency-modulated by a second picture signal, said receiver comprisnig: frequency-changing means, an intermediate frequency amplifier having a gain control input, a detector and a video frequency amplifier mounted in series, said detector and said video frequency amplifier having respective outputs; an electron element having a first electrode, a second electrode coupled to said video frequency amplifier output, and a third electrode; means for applying unblocking pulses to said first electrode during the horizontal flyback intervals; a first and a second integrating device, each comprising a capacitor, respectively inserted between said first electrode and ground, and between said third electrode and ground; a first and a second potential-dividing resistance respectively mounted across said capacitors of said first and second integrating devices, said potential-dividing resistances having respective outputs; a first and a second low-pass filtering circuit having respective inputs, respectively coupled to said outputs of said first and second potential-dividing resistances, and respective outputs; a filter having an input coupled to said detector output and an output; a frequency demodulator, coupled to said filter output and comprising an input limiter, having a limitation threshold control input, and frequency discriminating means mounted in series; said outputs of said low-pass filtering circuits being respectively coupled to said gain control input and to said limitation threshold control input.

9. A colour television receiver as claimed in claim 8, wherein said electron element is a triode having an anode, a grid and cathode, which are respectively the first, second and third electrodes of said electron element.

10. A colour television receiver for receiving a carrier wave which is amplitude-modulated by a complex video signal comprising a first picture signal and a subcarrier wave which is alternately frequency-modulated by a first and a second colour signal, said receiver comprising: frequency changing means, an intermediate-frequency amplifier having a gain control input, a detector and a video frequency amplifier mounted in series, said detector and said video frequency amplifier having respective outputs; an electron element having a first electrode, a second electrode coupled to said video-frequency amplifier output, and a third electrode; means for applying unblocking pulses to said first electrode during the horizontal flyback intervals; a first and a second integrating device, each comprising a capacitor, respectively inserted between said first electrode and ground, and between said second electrode and ground; a first and a second potential-dividing resistance respectively mounted across said capacitors of said first and second integrating devices, said potential-dividing resistances having respective outputs; a first and a second low-pass filtering circuit having respective inputs, respectively coupled to said outputs of said first and second potential-dividing resistances, and respective outputs; a filter having an input coupled to said detector output and an output; a direct and a delayed channel having respective inputs coupled to said filter output, and respective outputs: a switch having a first and a second input respectively coupled to said direct and delayed channel outputs, and a first and a second output, said switch having a first state in which it connects its first and second outputs respectively to its first and second inputs, and a second state in which it connects its first and second outputs respectively to its second and first inputs; and two frequency demodulators, each comprising a limiter having a signal input and a limitation threshold control input, and frequency discriminating means mounted in series; said signal inputs of said limiters being respectively coupled to said first and second outputs of said switch, said control input of said intermediate frequency amplifier being coupled to said output of said first low-pass filtering circuit, and said control inputs of said limiters being coupled to said output of said second low-pass filtering circuit.

11. A colour television signal demodulating circuit for use in a colour television system wherein the complex video signal comprises a first picture signal and a subcarrier which is frequency-modulated by a second picture signal, said demodulating circuit comprising a general input for applying thereto said colour television signal; a first signal-translating network, coupled to said general input, for delivering said first picture signal; a second signal-translating network, coupled to said general input, for delivering said second picture signal; said second signal-translating network comprising at least one frequency demodulator including a limiter having an input fed with said modulated subcarrier, and frequency discriminating means mounted in series; said limiter being of the type whose limitation threshold varies automatically as a function of the amplitude of its input signal.

12. A colour television signal demodulation circuit as claimed in claim 11, wherein said limiter is a self-biased diode limiter.

13. A colour television demodulating circuit as claimed in claim 11 wherein said circuit comprises further means for manually adjusting the limitation threshold of said limiter for a given amplitude of its input signal.

14. A colour television signal demodulating circuit for a colour television system wherein the complex video signal comprises a first picture signal and a subcarrier which is alternately frequency-modulated by two colour signals, said demodulating circuit comprising: a first signal-translating network delivering said first picture signal, and a second signal-translating network delivering said first and second colour signals; said second signal-translating network comprising: a direct and a delayed channel fed in parallel with said frequency-modulated subcarrier, said channels having respective outputs; a switch having a first and a second input respectively coupled to said direct and delayed channel outputs, and a first and a second output, said switch having a first state wherein it connects its first and second outputs respectively to its first and second inputs and a second state in which it connects its first and second outputs respectively to its second and first inputs; and two frequency demodulators, each comprising a limiter having an input and frequency discriminating means mounted in series, the inputs of said limiters being respectively coupled to said first and second switch outputs, and each limiter being of the type whose limitation threshold varies automatically as a function of the amplitude of its input signal.

15. A colour television signal demodulating circuit as claimed in claim 14 wherein said limiter is a self-biased diode limiter.

References Cited by the Examiner

UNITED STATES PATENTS

| | | | |
|---|---|---|---|
| 2,912,573 | 11/1959 | Mitchell | 325—348 |
| 3,234,469 | 2/1966 | Gunn | 325—348 |

DAVID G. REDINBAUGH, *Primary Examiner.*

J. H. SCOTT, *Assistant Examiner.*